United States Patent
Güntürkün

(10) Patent No.: US 10,374,853 B2
(45) Date of Patent: Aug. 6, 2019

(54) METHOD AND APPARATUS FOR LOW COMPLEXITY TRANSMISSION AND RECEPTION OF CONSTANT OR QUASI-CONSTANT ENVELOPE CONTINUOUS PHASE MODULATION WAVEFORMS

(71) Applicant: Marecomms Inc., Halifax (CA)

(72) Inventor: Ulaş Güntürkün, Halifax (CA)

(73) Assignee: MARECOMMS INC., Halifax (CA)

( * ) Notice: Subject to any disclaimer, the term of this patent is extended or adjusted under 35 U.S.C. 154(b) by 0 days.

(21) Appl. No.: 15/907,494

(22) Filed: Feb. 28, 2018

(65) Prior Publication Data

US 2018/0254935 A1    Sep. 6, 2018

Related U.S. Application Data

(63) Continuation of application No. PCT/TR2015/050081, filed on Aug. 28, 2015.

(51) Int. Cl.
*H04L 25/03* (2006.01)
*H04L 27/20* (2006.01)
*H04L 27/227* (2006.01)

(52) U.S. Cl.
CPC ...... *H04L 27/227* (2013.01); *H04L 25/03057* (2013.01); *H04L 25/03171* (2013.01);
(Continued)

(58) Field of Classification Search
CPC combination set(s) only.
See application file for complete search history.

(56) References Cited

U.S. PATENT DOCUMENTS

| 5,796,780 A | 8/1998 | Ramesh |
| 7,088,793 B1 * | 8/2006 | Mickelson ............ H04L 1/005 375/229 |

(Continued)

FOREIGN PATENT DOCUMENTS

| WO | 2017/039551 A1 | 3/2017 |
| WO | 2017/039558 A1 | 3/2017 |

OTHER PUBLICATIONS

Aulin et al., "Continuous Phase Modulation—Part II: Partial Response Signaling", IEEE Transactions on Communications, 1981, 2(3): 210-225.

(Continued)

*Primary Examiner* — Khanh C Tran
(74) *Attorney, Agent, or Firm* — Bereskin & Parr LLP/S.E.N.C.R.L., s.r.l.; Tony Orsi

(57) ABSTRACT

To reflect advantages of continuous phase modulation (CPM), the invention provides a low complexity transmitter and receiver to transmit and receive CPM signals and addresses a significant reduction in the CPM demodulator complexity, and is especially well-suited for large values of L, e.g., $L \geq 3$. The invention utilizes a linear filter front end as an integral part of the CPM demodulation process to reduce the ISI inherent in CPM transmit signal, and minimizes the influence of L in the reception process. To that end, the invention renders the complexity of a CPM demodulator non-exponentially dependent on L, and L only has a weak impact on the number of coefficients of the linear front end filters. Moreover, the invention provides a simple way of forming CPM signals for a digital communication transmitter using parallel Time Invariant Phase Encoders, which simplifies the production of CPM waveforms on software or hardware.

20 Claims, 6 Drawing Sheets

(52) U.S. Cl.
CPC .... *H04L 25/03318* (2013.01); *H04L 27/2003* (2013.01); *H04L 2025/03407* (2013.01)

(56) References Cited

U.S. PATENT DOCUMENTS

| | | | | |
|---|---|---|---|---|
| 8,401,121 | B1* | 3/2013 | Ozgur | H04L 25/067 375/329 |
| 2006/0047842 | A1* | 3/2006 | McElwain | H03M 13/2957 709/231 |
| 2007/0165757 | A1* | 7/2007 | Heiman | H04B 7/0854 375/347 |
| 2009/0154336 | A1* | 6/2009 | Green | H04L 5/0044 370/210 |
| 2011/0129028 | A1* | 6/2011 | Lee | H04L 25/03171 375/262 |
| 2013/0209089 | A1 | 8/2013 | Harley et al. | |
| 2014/0146925 | A1* | 5/2014 | Rog | H04L 1/005 375/341 |
| 2015/0110216 | A1* | 4/2015 | Bajcsy | H04B 1/40 375/285 |
| 2015/0341190 | A1* | 11/2015 | Cipriano | H04L 25/03076 375/232 |

OTHER PUBLICATIONS

Svensson et al., "A Class of Reduced-Complexity Viterbi Detectors for Partial Response Continuous Phase Modulation", IEEE Transactions on Communications, 1984, 32(10): 1079-1087.

Bahl et al., "Optimal Decoding of Linear Codes for Minimizing Symbol Error Rate", IEEE Transactions on Information Theory, 1974, 20(2): 284-287.

Forney et al., "The Viterbi Algorithm", Proceedings of the IEEE, 1973, 61(3): 268-278.

Laurent, "Exact and Approximate Construction of Digital Phase Modulations by Superposition of Amplitude Modulated Pulses (AMP)", IEEE Transactions on Communications, 1986, 34(2): 150-160.

Mengali et al., "Decomposition of M-ary CPM Signals into PAM Waveforms", IEEE Transactions on Information Theory, 1995, 41(5): 1265-1275.

Kaleh, "Simple Coherent Receivers for Partial Response Continuous Phase Modulation", IEEE Journal on Selected Areas in Communications, 1989, 7(9): 1427-1436.

Shane et al., "Reduced Complexity Iterative Demodulation and Decoding of Serial Concatenated Continuous Phase Modulation", Proceedings of IEEE International Conference on Communications, 2002, pp. 1672-1676.

Colavolpe et al., "Reduced-Complexity Detection and Phase Synchronization of CPM Signals", IEEE Transactions on Communications, 1997, 45(9): 1070-1079.

Colavolpe et al., "Simplified Iterative Detection of Serially Concatenated CPM Signals", Global Telecommunications Conference, IEEE Globecom 2005, pp. 1358-1362 (St. Louis, MO, USA).

Barbieri et al., "Simplified Soft-Output Detection of CMP Signals Over Coherent and Phase Noise Channels", IEEE Transactions on Wireless Communications, 2007, 6(7): 2486-2496.

Cero et al., "On Reduced-Complexity Soft-Output Detection of Continuous Phase Modulations", Vehicular Technology Conference, VTC Spring 2008, pp. 1092-1096, Singapore, Singapore.

Casini et al., "Advanced CPM Receiver for the NATO Tactical Narrowband Waveform", Military Communications Conference, MILCOM 2010, pp. 506-511 (San Jose, CA, USA).

Huang et al., "Simple Noncoherent CPM Receivers by PAM Decomposition and MMSE Equalization", 14th IEEE Symposium on Personal, Indoor and Mobile Radio Communication Proceedings, PIMRC 2003, pp. 707-711 (Beijing, China).

Poor et al., "Probability of Error in MMSE Multiuser Detection", IEEE Transactions on Information Theory, 1997, 43(3): 858-871.

Wang et al., "Iterative (Turbo) Soft Interference Cancellation and Decoding for Coded CDMA", IEEE Transactions on Communications, 1999, 47(7): 1046-1061.

International Search Report and Written Opinion received in corresponding International Patent Application No. PCT/TR2015/050081, dated Jul. 13, 2016.

International Preliminary Report on Patentability received in corresponding International Patent Application No. PCT/TR2015/050081, dated Mar. 6, 2018.

International Search Report and Written Opinion received in related International Patent Application No. PCT/TR2016/050311, dated Dec. 22, 2016.

International Preliminary Report on Patentability received in related International Patent Application No. PCT/TR2016/050311, dated Mar. 6, 2018.

Bossert et al., "Generalized Concatenated Encoded Gaussian Filtered CPM", ITG-Fachberichte, 1999, pp. 391-396, XP00092557.

Rimoldi et al., "A Decomposition Approach to CPM", IEEE Transactions on Information Theory, 1988, 34(2): 260-270.

Maw et al., "Space-Time Coded Systems with Continuous Phase Frequency Shift Keying", Globecom '05, IEEE, 2005 vol. 3, pp. 1581-1586.

Altunbas et al., "Design of multilevel coded M-ary CPFSK systems with modulation index ½", GlobeCom '95, IEEE 1995, vol. 1, pp. 644-648.

Bossert et al., "Generalised concatenation of encoded Gaussian filtered continuous phase modulation", IEEE Proceedings: Communications, 2000, 147(4): 205-210.

Shane et al., "Reduced complexity iterative demodulation and decoding of serial concatenated continuous phase modulation", Conference Record of the 35th, Asilomar Conference on Signals, Systems, & Computers, 2001, vol. 1, pp. 1672-1676.

* cited by examiner

METHOD AND APPARATUS FOR LOW COMPLEXITY TRANSMISSION AND RECEPTION OF CONSTANT OR QUASI-CONSTANT ENVELOPE CONTINUOUS PHASE MODULATION WAVEFORMS

FIELD OF THE INVENTION

The present invention relates to modulator and demodulator apparatus and methods for M-ary constant or quasi-constant envelope modulation signal, an is particularly directed to methods producing configurations for processors carrying out Continuous Phase Modulation signals with low complexity.

BACKGROUND OF THE INVENTION

Continuous Phase Modulation (CPM) is a bandwidth, energy and battery efficient digital modulation technique, exhibiting smooth transitions in its phase, which conveys the information content. Smooth phase transitions enable bandwidth efficiency gains by virtue of concentrating the signal's power in a compact spectral band, allowing adjacent waveforms to be packed closer together in the frequency domain. The constant envelope property of CPM leads to significant savings in DC (direct current) power, which translates into battery efficiency for mobile digital communication terminals, such as handsets or satellites.

To achieve the phase smoothness, most CPM techniques employ phase smoothing pulses such as raised cosine (RC) or rectangular (REC) pulses, whose length (L) may be several integer multiples of symbol duration (T), and acts as the modulation memory. This boils down to intentionally introducing intersymbol interference, as multiple pulses occupy one symbol interval. Besides the phase smoothing pulse, the two other free parameters managing the characteristics of a CPM signal are the modulation index h, and the alphabet size, M. The modulation index h is described as the ratio of the frequency deviation to the frequency of the modulating wave, and defined to be h≜k/p such that k and p are two mutually prime integers. As h gets smaller, the distance among the CPM symbols is decreased, which results in an even more compact spectra at the expense of reduced resilience to error. M on the other hand determines the variety of information messages to be transmitted. As M gets higher, transmission signals are selected from a richer set, offering greater error resilience.

A CPM signal can be expressed as $$z(t, \alpha) = \exp\left\{j2\pi h \sum_n \alpha_n q(t - nT)\right\} \quad (1)$$

where t denotes time, and T denotes the symbol duration, both measured in seconds, $\alpha_n \in \{\pm 1, \pm 3, \ldots, \pm(M-1)\}$ is the M-ary message symbol, and $\alpha$ stands for the history of message symbols such that $\alpha = [\alpha_n, \alpha_{n-1}, \ldots]$. q(.) is the phase smoothing response of a CPM waveform, and it is related to the underlying frequency pulse, f(.) with the following relation:

$$q(t) = \int_{-\infty}^{t} f(\tau) d\tau \quad (2)$$

Unfortunately the optimal CPM demodulator has a demodulation complexity that varies exponentially in the pulse length. Specifically, an optimal CPM demodulator requires $2pM^L$ front end matched filters [1, 2], and a detector with $pM^{L-1}$ states in its trellis. This high demodulation complexity renders the implementation of highly spectrally efficient CPM schemes unrealistic on the state-of-the-art digital hardware platforms.

The front end filtering in a digital communication receiver enables to maximize the signal-to-noise ratio (SNR) by matching the receiver filter to the transmission filter. The trellis structure in a digital communication system on the other hand describes the evolution of the transmission symbols in terms of nodes and branches of a graph. Each node in the trellis graph is termed a state, which are interconnected with branches. The combination of the previous trellis state and the present information symbol activate a branch in the trellis graph, which results in the emission of a new transmission symbol.

In a digital communication receiver, the number of states in the trellis is a primary indicator of complexity, as the detector in the receiver has to calculate the a posteriori probability of each state transition if the Maximum a posteriori Probability (MAP) criteria is invoked as the objective of the detection. Likewise, the detector has to calculate the likelihood of each state transition if the Maximum Likelihood (ML) detection criteria is chosen. Then the detector selects the most probable, or the most likely branch for the MAP, and the ML criteria, respectively, to declare a decision. Two iterative, and popular algorithms to realize the MAP and ML detection are the BCJR [3] and the Viterbi algorithms [4], respectively.

To reduce the computational complexity of a CPM demodulator, various CPM decomposition techniques have been proposed, among which the work of Laurent [5], and that of Mengali and Morelli [6] are the most prominent techniques from a complexity-reduction standpoint. Laurent's decomposition expresses a CPM waveform as a superposition of Pulse Amplitude Modulated (PAM) components for M=2, i.e., binary CPM. Laurent's seminal work for binary CPM is generalized to an arbitrary CPM alphabet size by Mengali and Morelli [6]. According to Laurent, Mengali and Morelli's method, a CPM waveform can be approximated as $$z(t, \alpha) \approx \sum_{k=0}^{F-1} \sum_n a_{k,n} g_k(t - nT) \quad (3)$$

$$Q \triangleq 2^{L-1}, P \triangleq \lceil \log_2 M \rceil, F \triangleq Q^P(M-1) \quad (4)$$

where F is the number of PAM components in the decomposition, $a_{k,n}$ denote CPM pseudosymbols, and $g_k(.)$ denote the Laurent pulses. The sign ≜ denotes the mathematical definition of a parameter, and the operation $\lceil . \rceil$ denotes the ceiling operation, which rounds its argument to the nearest integer above its current value. Generation of CPM pseudosymbols, $a_{k,n}$ with respect to the actual message symbols, $\alpha_n$, and the calculation of the Laurent pulses, $g_k(t)$ are presented in detail in the papers [5] for binary CPM, and in [6] for M-ary CPM.

Laurent-Mengali-Morelli decomposition can be utilized both at a transmitter and a receiver, which leads to a matched reception. In this case, since this decomposition is an approximation, there may be slight fluctuations in the radio frequency (RF) envelope of the transmitted signal, yielding a quasi-constant envelope signal, rather than a strictly constant envelope signal. Alternatively, Laurent-Mengali-Morelli decomposition may be utilized only at a receiver, while transmitter emits true CPM signal with constant envelope, leading to a mismatched reception.

An important observation related to $g_k(.)$ is that the main pulse, i.e., $g_0(t)$, carries a significant portion of the signal energy in a binary CPM realization. This observation leads to various simplifications of CPM waveforms by simply truncating the PAM decomposition to a single pulse representation for binary CPM, where only the main pulse, $g_0(t)$ is retained in the decomposition, and the rest of the pulses are discarded [7, 8]. Similarly, for M-ary CPM, the first $2^P-1$ pulses convey most of the signal energy. Following from this, for M-ary CPM, a principal pulses approximation is developed in [9-13], retaining the first $2^P-1$ pulses in the Laurent-Mengali-Morelli decomposition and dismissing the rest of the pulses.

As the state-of-the-art low complexity CPM demodulator design, the work of Colavolpe et al. [9-13] utilizes the principal pulse approximation of CPM, which yields a near-optimal demodulation performance for L=2. In particular, for L=2, the method presented in [9-13] employs $2^P-1$ matched filters at the front end, and an ML or MAP detector with a p-state trellis. For L=3 however, the complexity of the method presented in [9-13] is increased such that an ML or MAP or detector with pM-state trellis is required. The performance of this method, however, deteriorates significantly for L>3, and the complexity reduction gains are compromised. Hence the state-of-the-art low complexity CPM demodulator [9-13] is adequate only for L=2.

Another reduced complexity CPM demodulator design [7] is developed only for the binary CPM, (i.e., M=2), which utilizes a minimum mean square error (MMSE) filter, followed by a Viterbi detector.

Yet another reduced complexity CPM demodulator is proposed in [14], which however concerns only non-coherent reception.

What is needed in the art is a method and apparatus to simplify the coherent CPM demodulator design for all CPM configurations and arbitrary values of h, M, and L to achieve high spectral efficiencies with a near-optimal, or reasonable performance with low complexity, so that efficient signal processing algorithms and hardware may be designed. This need is seen for both constant or quasi-constant envelope CPM schemes.

SUMMARY OF THE INVENTION

It is an object of this invention to provide low complexity alternative to apparatus and methods for coherent demodulation of constant or quasi-constant envelope, binary (i.e., M equals 2) or higher order (i.e., M greater than 2) CPM signals, or corresponding programs or corresponding methods to produce configurations for processors for carrying out such methods.

According to an aspect of the invention, the invention provides a low complexity demodulator having a complexity that is related non-exponentially to the CPM pulse length (L), the receiver being arranged to include K linear discrete filters on parallel arms, placed after a bank of K parallel matched filters, generating mean estimates of CPM pseudo-symbols on parallel arms and reducing the intersymbol interference inherent in CPM, hence combating the effect of CPM memory, imposed by CPM pulse length (L), and connecting a memoryless ML or MAP detector at the demodulator back end.

In accordance with another aspect of the invention, soft (probabilistic) decoding information, becoming available in a digital communication receiver whenever a soft input soft output (SISO) decoding is used for forward error correction, is fed back to linear filters, leading to soft interference cancellation hence improving the demodulation accuracy.

Another aspect of the invention is similar to the method immediately above, except only one linear discrete filter may be used, generating mean CPM pseudosymbols in a single arm.

It is yet another object of this invention to provide a simplification in the generation of constant or quasi-constant envelope, binary (M equals 2) or higher order (i.e., M greater than 2) CPM signals.

In accordance with one aspect of the invention, is a method and apparatus for transmitting a CPM signal using Laurent's and Mengali-Morelli's CPM decompositions. In this method, an information message sequence is inputted to a bank of P parallel Time Invariant Phase Encoders (TIPE). The sequence outputted by TIPE units are first mapped onto CPM subsymbols by an element-wise memoryless mapper. CPM subsymbols are inputted into a product generator, generating CPM pseudosymbols. CPM pseudosymbols are modulated onto an M-ary PAM waveform, that is the superposition of PAM component pulses in each symbol duration such that the pulses are derived by full decomposition of Laurent-Mengali-Morelli.

The number of PAM component pulses within the modulator can be $K=F=Q^P$ (M-1) if the full Laurent-Mengali-Morelli decomposition is invoked. Alternatively, the number of PAM component pulses can be reduced to $K=2^P-1$ principal pulses. As yet another alternative, the $K=2^P-1$ principal pulses can be further optimized with respect to the mean square error criteria as presented in Laurent's [5] and Mengali-Morelli's work [6].

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

Any of the additional elements can be combined together and combined with any of the aspects. Numerous variations and modifications can be made without departing from the claims of the present invention. Therefore, it should be clearly understood that the form of the present invention is illustrative only, and is not intended to limit the scope of the present invention.

BRIEF DESCRIPTION OF THE DRAWINGS

The foregoing and other aspects, features and advantages will become apparent in the following Detailed Description of the Preferred Embodiments, when read in conjunction with the appended drawings, in which:

FIG. 11 shows uncoded bit error rate (BER) performance achieved by invention for a CPM scheme M=2, h=¼, 3RC with comparison to optimum and full complexity CPM demodulator, and a state-of-the-art reduced complexity technique of [9-13].

FIG. 12 is similar to FIG. 11, but showing uncoded BER results for CPM scheme M=2, h=¼, 4RC.

FIG. 13 is similar to FIG. 11 and FIG. 12, but showing uncoded BER results for CPM scheme M=4, h=¼, 3RC.

FIG. 14 is similar to FIG. 11, FIG. 12 and FIG. 13, but showing uncoded BER results for CPM scheme M=4, h=¼, 4RC.

LIST OF THE ELEMENTS INDICATED IN DRAWINGS

Figure 1:
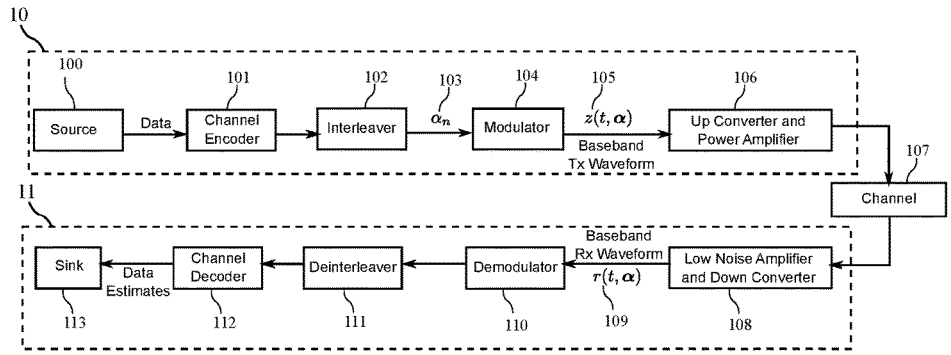
FIG. 1 is a block diagram of an example of a typical transmit and receive chain of a digital communication system, showing different modulators and demodulators, interleavers and deinterleavers, and forward error correction (FEC) encoders and decoders.

10 Transmitter. 100 Source. 101 Channel Encoder. 102 Interleaver. 103 Encoded Data. 104 (Digital) Modulator. 105 Baseband Transmit (Tx) Waveform. 106 Up Converter and Amplifier. 107 Channel. 11 Receiver. 108 Down Converter and Amplifier. 109 Baseband Received (Rx) Waveform. 110 (Digital) Demodulator. 111 Deinterleaver. 112 Channel Decoder. 113 Sink. 200 Base 2 Converter, or Demultiplexer.

201 Binary Symbols (Bits).
    201a Bit in the (0)'th parallel arm, i.e., $\gamma_n^{(0)'}$.
    201b Bit in the (1)'st parallel arm, i.e., $\gamma_n^{(1)'}$.
    201c Bit in the (P−1)'th parallel arm, i.e., $\gamma_n^{(P-1)'}$.
202 Phase Encoder.
    202a Time Invariant Phase Encoder (TIPE) in the (0)'th parallel branch.
    202b TIPE in the (1)'st parallel branch.
    202c TIPE in the (P−1)'th parallel branch.
203 Phase Encoder Output Vectors.
    203a Time Invariant Phase Encoder Output Vector for the (0)'th parallel branch, $s_n^{(0)}$.
    203b Time Invariant Phase Encoder Output Vector for the (1)'st parallel branch, $s_n^{(1)}$.
    203c Time Invariant Phase Encoder Output Vector for the (P−1)'th parallel branch, $s_n^{(P-1)}$.
204 Decimal Converter.
205 Decimal Correspondents of TIPE Outputs.
    205a Decimal Correspondent of TIPE Output $x_n^{(0)}$, for (0)'th parallel branch.
    205b Decimal Correspondent of TIPE Output $x_n^{(1)}$, for (1)'st parallel branch.
    205c Decimal Correspondent of TIPE Output $x_n^{(P-1)}$, for (P−1)'th parallel branch.
206 Element-Wise Memoryless Mapper.
207 CPM subsymbols.
    207a CPM subsymbol $b_{0,n}^{(0)}$, for the (0)'th parallel branch.
    207b CPM subsymbol $b_{0,n}^{(1)}$, for the (1)'st parallel branch.
    207c CPM subsymbol $b_{0,n}^{(P-1)}$, for the (P−1)'th parallel branch.
208 Pseudosymbol Generator.
209 CPM Pseudosymbols.
    209a CPM Pseudosymbol $a_{0,n}$, for the (0)'th parallel branch.
    209b CPM Pseudosymbol $a_{1,n}$, for the (0)'st parallel branch.
    209c CPM Pseudosymbol $a_{K-1,n}$, for the (K−1)'th parallel branch.
210 CPM Pulses.
    210a CPM Pulse $g_0(t)$, for the (0)'th parallel branch.
    210b CPM Pulse $g_1(t)$, for the (1)'st parallel branch.
    210c CPM Pulse $g_{K-1}(t)$, for the (K−1)'th parallel branch.
211 Decimal summer.
30 A Binary Symbol (Bit).
    For l=0, 30=201a, for l=1, 30=201b, . . . , for l=P−1, 30=201c.
31 A Binary Adder. 32 A Unit Delay Element. 33 A Binary Multiplier.
34 An Element of A Binary TIPE Output Vector.
    34a (0)'th element of a Binary TIPE Output Vector.
    34b (1)'st element of a Binary TIPE Output Vector.
    34c (P−1)'th element of a Binary TIPE Output Vector.
400 A Node in A Trellis. 401 A Parallel Branch in A Trellis. 402 A Diagonal Branch in A Trellis.
50 Noise reduction filter.
    50a Matched Filter $g_0(-t)$, for the (0)'th parallel arm.
    50b Matched Filter $g_1(-t)$, for the (1)'st parallel arm.
    50a Matched Filter $g_{K-1}(-t)$, for the (K−1)'st parallel arm.
51 Sampler.
52, 600 Received Samples.
    52a, 600a Received sample at time instant n, $r_{0,n}$, for the (0)'th parallel arm.
    52b, 600b Received sample at time instant n, $r_{1,n}$ for the (1)'st parallel arm.
    52c, 600c Received sample at time instant n, $r_{K-1,n}$ for the (K−1)'st parallel arm.
53 Linear Filter.
    53a Feedforward linear filter for which the desired response is $\alpha_{0,n}$.
    53b Feedforward linear filter for which the desired response is $\alpha_{1,n}$.
    53c Feedforward linear filter for which the desired response is $\alpha_{K-1,n}$.
54 CPM Pseudosymbol Estimates.
    54a The CPM Psendosymbol Estimate $\hat{\alpha}_{0,n}$, for the (0)'th parallel arm.
    54b The CPM Pseudosymbol Estimate $\hat{\alpha}_{1,n}$, for the (1)'st parallel arm.
    54a The CPM Pseudosymbol Estimate $\hat{\alpha}_{K-1,n}$, for the (K−1)'st parallel arm.
55 CPM Symbol Detector.
56 Data Symbol Estimate.
601 Linear Filter with Soft Decision Feedback.

601a Linear Filter with Soft Decision Feedback for the (0)'th parallel arm.
601b Linear Filter with Soft Decision Feedback for the (1)'st parallel arm.
601c Linear Filter with Soft Decision Feedback for the (K−1)'st parallel arm.
602 The CPM Pseudosymbol Estimate with Soft Decision Feedback.
  602a The CPM Pseudosymbol Estimate with Soft Decision Feedback for the (0)'th parallel arm.
  602b The CPM Pseudosymbol Estimate with Soft Decision Feedback for the (1)'st parallel arm.
  602c The CPM Pseudosymbol Estimate with Soft Decision Feedback for the (K−1)'st parallel arm.
603 Intersymbol Interference Estimates
  603a Intersymbol interference estimates affecting the linear filter at the (0)'th parallel arm.
  603b Intersymbol interference estimates effecting the linear filter at the (1)'st parallel arm.
  603c Intersymbol interference estimates affecting the linear filter at the (K−1)'st parallel arm.
  604 Soft Input, Soft Output (SISO) CPM Symbol Detector. 605 Soft decisions (i.e., probabilities) on the joint CPM state. 606 Remodulator. 607 SISO Channel Decoder. 608 Extrinsic Information. 609 a priori information. 610 a posteriori data estimates.

A Brief Description of a Communication System in Which the Invention is Used The present invention will now be described more fully hereinafter with reference to the accompanying drawings, in which preferred embodiments are shown. This invention may however be embodied in many different forms, and should not be construed as limited to the embodiments set forth herein. Rather, these embodiments are provided so that this disclosure will be thorough and complete, and will fully convey the scope of the invention to those skilled in the art.

For purposes of description, a typical digital communication system used for transmitting and receiving digital data is shown in FIG. 1. As shown in FIG. 1, a source 100 emits digital data, typically composed of binary digits of "0"s and "1"s. The channel encoder 101 encodes data to accomplish forward error correction (FEC), and applies a FEC algorithm to data, which are passed onto an interleaver 102. The encoded and interleaved data 103 are modulated by a digital modulation scheme 104. The present invention uses coherent constant or quasi-constant envelope Continuous Phase Modulation in the modulator 104. The baseband transmit waveform obtained at the modulator output 105 is up-converted to bandpass, and amplified 106 and transmitted to a channel 107. Said channel 107 can be a high frequency (HF), very high frequency (VHF), ultra high frequency (UHF), super high frequency (SHF), extremely high frequency (EHF), or tremendously high frequency (THF) channel.

At a receiver section, bandpass received signal is amplified by a low noise amplifier and down-converted to baseband 108. Baseband received waveform 109 is demodulated 110, which is followed by deinterleaving 111. A channel decoder 112 decodes data and passes data estimates to a sink 113.

Detailed Description of the Preferred Embodiments

A communication transmitter 10 comprises a modulator 104, and according to an embodiment it can further comprise a channel encoder 101, and/or an interleaver 102. A communication receiver 11 comprises a demodulator 110, and according to an embodiment it can further comprise a channel decoder 112, and/or a deinterleaver 11, and/or a joint demodulator and decoder 110, 111, 112, comprising at least one interleaver and one deinterleaver.

Detailed Description of the Modulator (104)

Figure 2:
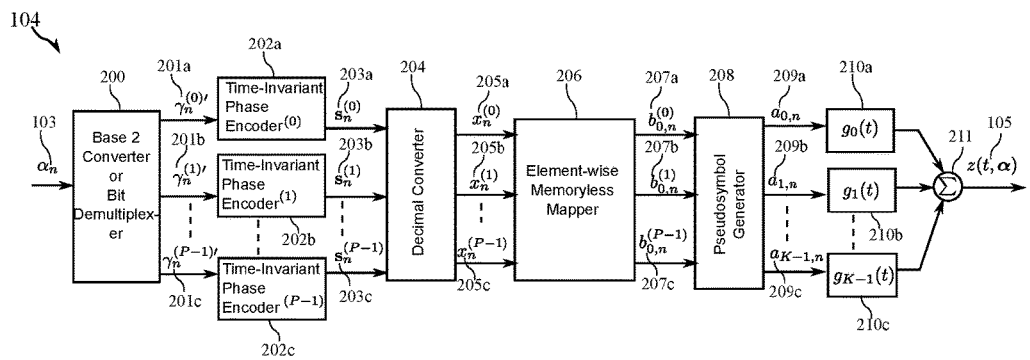
FIG. 2 is a block diagram of an example for generation mechanism of a CPM signal within the present invention, which concerns the digital modulator in a typical communication system of FIG. 1.

The modulator section of the invention comprises a base 2 converter (alternatively a demultiplexer) 200, which outputs binary symbols (bits) 201, a total of P parallel Time Invariant Phase Encoders 202, having output vectors 203, a decimal converter 204 with decimal correspondents of TIPE outputs 205, an element-wise memoryless mapper 206 outputting CPM subsymbols 207, a CPM pseudosymbol generator 208 outputting CPM pseudosymbols 209, which are fed into a bank of CPM pulses 210 and a decimal summer 211. FIG. 2 shows a preferred embodiment pertaining to modulator section of invention where a simple method for constructing CPM waveforms is depicted. As shown in FIG. 2, in a preferred embodiment of invention, if the message data are first encoded by a channel encoder, M-ary encoded symbols 200 are obtained at the encoder output, which are then converted into binary symbols (bits) 201, (i.e., 201a: $\gamma_n^{(0)}$, 201b: $\gamma_n^{(1)}$, ..., 201c: $\gamma^{(K-1)}$). If data symbols 200 are already in binary form, they are demultiplexed into parallel binary streams. If a channel encoder is not used at all, then the M-ary symbols 200 are data symbols.

Binary symbols 201a, 201b, ..., 201c are fed into Time Invariant Phase Encoders 202. There are a total of P Time Invariant Phase Encoders in parallel arms (i.e., 202a, 202b, ..., 202c). Time Invariant Phase Encoders 202 are fully recursive encoder structures, each having a code rate of 1/P, where P=⌈$\log_2 p$⌉ is defined (i.e., P is the nearest integer above the value of $\log_2 p$). Hence at TIPE outputs, binary vectors 203 (i.e., 203a: $s_n^{(0)}$, 203b: $s_n^{(1)}$, ..., 203c: $s_n^{(P-1)}$) are formed, where each such vector is P dimensional. Accordingly, the output vector of the l'th TIPE is composed of P bits, arranged as, $s_n^{(l)} \triangleq [s_n^{(l),0}, s_n^{(l),1}, \ldots, s_n^{(l),P-1}]$, l=0, 1, ..., P−1.

Binary TIPE output vectors 203 are applied to a binary-to-decimal conversion 204, and transformed into decimal form 205 (i.e., 205a: $x_n^{(0)}$, 205b: $x_n^{(1)}$, ..., 205c: $x_n^{(P-1)}$). In this conversion, $s_n^{(l),0}$ is the most significant bit, while $s_n^{(l),P-1}$ is the least significant bit. Decimal correspondents of TIPE outputs 205a, 205b, ..., 205c are obtained from the binary vectors in following way:

$$x_n^{(l)} \triangleq 2^0 s_n^{(l),P-1} + \ldots + 2^{P-1} s_n^{(l),0}, \; l=0,1,\ldots,P-1 \quad (5)$$

An element-wise memoryless mapper 206 maps decimal values for TIPE outputs onto CPM subsymbols 207 (i.e., 207a: $b_{0,n}^{(0)}$, 207b: $b_{0,n}^{(1)}$, ..., 207c: $b_{0,n}^{(P-1)}$), element-wise. This mapping is ruled as $$b_{0,n}^{(l)} \triangleq \exp[j\pi h^{(l)}(2x_n^{(l)}-n)], \; l=0,1,\ldots,P-1 \quad (6)$$

$$h^{(l)} \triangleq 2^{(l)}h, \; l=0,1,\ldots,P-1 \quad (7)$$

where n is the discrete time index.

A pseudosymbol generator 208 generates CPM pseudosymbols 209 (i.e., 209a: $\alpha_{0,n}$, 209b: $\alpha_{1,n}$, ..., 209c: $\alpha_{K-1,n}$), which are obtained based on CPM subsymbols 207a, 207b, ..., 207c. For particularly important CPM classes, for example, for binary CPM (M=2), one obtains $\alpha_{0,n}=b_{0,n}^{(0)}$, as there is only one CPM pseudosymbol and one subsymbol, i.e., P=⌈$\log_2 M$⌉=1, K=$2^P$−1=1.

Higher order (M greater than 2) CPM pseudosymols can be obtained using systematic presented in [6].

CPM pulses 210 (i.e., 210a: $g_0(t)$, 210b: $g_1(t)$, ..., 210c: $g_{K-1}(t)$) can be obtained simply by maintaining the first $K=2^P-1$ pulses (i.e., principal pulses) out of a total of $F=Q^P(M-1)$ pulses, and dismissing the rest of F-K (non principal) pulses. Alternatively, K pulses can be chosen in an optimum fashion with respect to the mean squared error criteria. In particular, optimum pulse weighting coefficients can be found as the minimizer of the mean squared difference between the original CPM signal and the approximate CPM signal as presented in [5], [6].

211 is a decimal adder, which sums the outputs of CPM pulses, and results in approximate CPM baseband transmit waveform 105 in light of Laurent, Mengali-Morelli decomposition.

Figure 3:
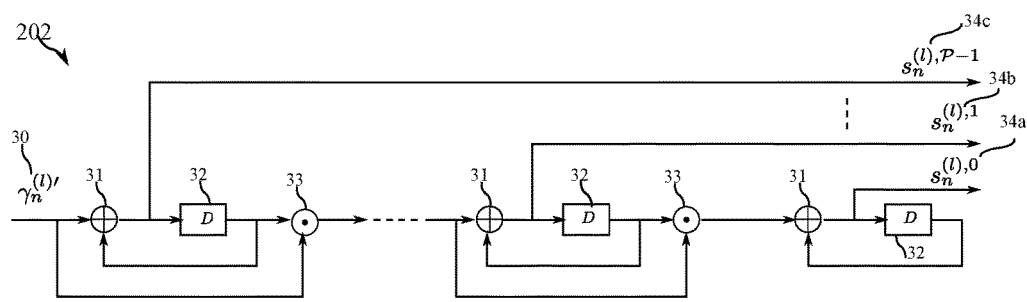
FIG. 3 is a block diagram for realization of a Time Invariant Phase Encoder within present invention.

Internal structure of Time Invariant Phase Encoders 202a, 202b, ..., 202c, which are central to the above preferred embodiment, are shown in FIG. 3. 30 is a binary value (a bit), which is inputted to l'th TIPE, l=0, ..., P-1. 31 is a modulo-2 adder (i.e., binary adder), performing Boolean addition, which can be implemented on hardware with an XOR gate. 32 is a unit delay block, which can be implemented on hardware with a shift register. 33 is a modulo-2 multiplier (i.e., binary multiplier), performing Boolean multiplication, and can be implemented on hardware using an AND gate. The binary adder, binary multiplier and delay blocks are interconnected to form a TIPE as shown in FIG. 3. Binary TIPE outputs 34 (i.e., 34a: $s_n^{(l),0}$, 34b: $s_n^{(l),1}$, ..., 34c: $s_n^{(l),P-1}$), form a TIPE biliary output vector according to the rule given in eq. (5).

Figures 4, 5, 6:
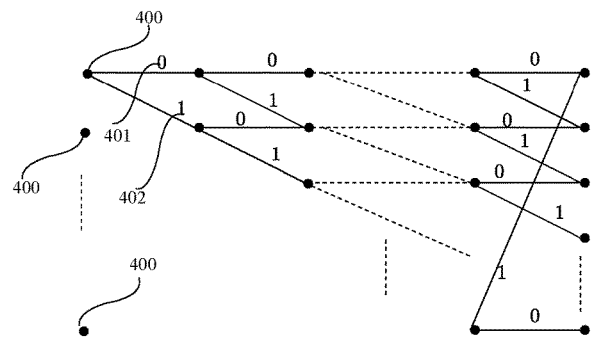
FIG. 4 is an example of a trellis diagram showing state transitions for a Time Invariant Phase Encoder within present invention.
FIG. 5 is a block diagram of a CPM demodulator within present invention, employing a bank of matched filters and a bank of linear filters in front end to combat ISI that is inherent in CPM transmit signals as a result of modulation memory.
FIG. 6 is a block diagram of a CPM demodulator within present invention, employing a bank of matched filters in front end, and a bank of linear filters similar to FIG. 5, but further comprising soft decision feedback to further reduce ISI caused by CPM memory more effectively.

The trellis structure, which is common to all Time Invariant Phase Encoders, is depicted in FIG. 4. Trellis nodes 400 represent states of Time Invariant Phase Encoders. Each 0 input bit as 401 causes a lateral transition in trellis. Each 1 input bit as 402 causes a diagonal transition in trellis. Trellis has a total of p states.

Detailed Description of the Demodulator (110)

In a preferred embodiment, to demodulate the baseband received waveform 109, the demodulator comprises a noise reduction filter 50. In one embodiment, the noise reduction filter is realized as a bank of matched filters (50a, 50b, ..., 50c). These are a total of K such matched filters (50a, 50b, ..., 50c) at the receiver front end, the outputs of which are sampled 51 at symbol time, which leads to the production of a set of received samples 52 on parallel arms, a bank of K linear filters 53 producing CPM pseudosymbol estimates 54, and a CPM symbol detector 55. In a preferred embodiment as in FIG. 5, a simplified receiver for constant or quasi-constant CPM is obtained. The received signal 109 is fed into a bank of matched filters 50a, 50b, ..., 50c. One sample per symbol duration is taken at output of matched filters with a sampler, which can be realized using analog-to-digital converters (ADC) 51 in an embodiment. Received samples 52 (i.e., 52a: $r_{0,n}$, 52b: $r_{1,n}$, ..., 52c: $r_{K-1,n}$) are fed into linear filters 53 (i.e., 53a, 53b, ..., 53c), which produce CPM pseudosymbol estimates 54 (i.e., 54a: $\hat{\alpha}_{0,n}$, 54b: $\hat{\alpha}_{1,n}$, ..., 54c: $\hat{\alpha}_{K-1,n}$). The purpose of linear filters is to reduce the intersymbol interference (ISI) that is inherent in CPM transmission signals, hence combat the effect of CPM modulation memory. CPM pseudosymbol estimates 54a, 54b, ..., 54c are processed by CPM symbol detector 55, which delivers desired modulation symbol estimates 56.

A more detailed description for the receiver structure in FIG. 5 is what follows:

Detailed Description of the Demodulator in FIG. 5

Demodulator comprises, a noise reduction filter 50. In this embodiment, the noise reduction filter is realized as a bank of parallel matched filters, 50a, 50b, ..., 50c. These are a total of K such matched filters (i.e., 50a, 50b, ..., 50c) at the receiver front end, where K denotes the number of PAM components in Laurent Approximation of CPM. Let $g_k(t)$ denote the impulse response of the k'th pulse, k=0, ..., K-1. Then the samples obtained at the i'th matched filter output by a sampler 51 for the n'th symbol interval are defined as:

$$r_{i,n} \triangleq \int_{nT}^{(n+1)T} r(t) g_i(t-nT) dt, \; i=0, \dots, K-1 \quad (8)$$

where 50a is obtained for i=0 in eq. (8), 50b is obtained for i=1 in eq. (8), and 50c is obtained for i=K-1 in eq. (8).

Let $L_{ki}$ denote the length of the discrete equivalent of the convolution between the k'th transmit pulse, and the i'th matched filter impulse response, which is implied in eq. (8). Then the discrete time equivalent observation model reads $$r_{i,n} = \sum_{k=0}^{K-1} \sum_{l=0}^{L_{ki}-1} a_{k,n-l} g_{ki}[l] + v_{i,n}, \quad i=0, \dots, K-1 \quad (9)$$

where it is defined $$g_{ki}[l] \triangleq g_{ki}(lT) = \int_{-\infty}^{\infty} g_i(t) g_k(t-lT) dt, \; k=0, \dots, K-1, \\ i=0, \dots, K-1 \quad (10)$$

At the output of the matched filter bank, a set of received samples are obtained 52. There are a total of K received samples (i.e., 52a: $r_{0,n}$, 52b: $r_{1,n}$, ..., 52c: $r_{K-1,n}$) at any time instant, n. The received samples 52 are processed by a bank of linear filters 53. There are a total of K linear filters (53) in parallel arms (i.e., 53a, 53b, ..., 53c). For such processing, sliding windows of received samples are constructed first, which are composed of $N^+ + N^- + 1$ received samples. The conventional terminology for $N^+$ and $N^- + 1$ is, respectively, the number of prediction lags, and the number of smoothing lags. The linear filtering operations are more conveniently described in vector-matrix form. To this end, let the following definitions of variables be made:

$$r_{i,n} \triangleq [r_{i,n+N^+}, \dots, r_{i,n}, \dots, r_{i,n-N^-}]^T_{(N^+ + N^- +1) \times 1} \quad (11)$$

$$v_{i,n} \triangleq [v_{i,n+N^+}, \dots, v_{i,n}, \dots, v_{i,n-N^-}]^T_{(N^+ + N^- +1) \times 1} \quad (12)$$

$$a_{k,n}^{L_{ki}} \triangleq [a_{k,n+N^+}, \dots, a_{k,n}, \dots, a_{k,n-N^- -L_{ki}+1}]^T_{(L_{ki}+N^+ + N^-) \times 1} \quad (13)$$

$$L_i \triangleq \sum_{k=0}^{K} L_{ki} = L_{0i} + L_{1i} + \dots + L_{(K-1)i} \quad (14)$$

$$a_{i,n} \triangleq \left[ [a_{0,n}^{L_{0i}}]^T, [a_{1,n}^{L_{1i}}]^T, \dots, [a_{K-1,n}^{L_{(K-1)i}}]^T \right]^T_{(L_i + K(N^+ + N^-)) \times 1} \quad (15)$$

$$g_{ki} \triangleq [g_{ki}[0], g_{ki}[1], \dots, g_{ki}[L_{ki}-1]]^T_{L_{ki} \times 1} \quad (16)$$

$r_{i,n}$ in eq. (11) denotes the $(N^+ + N^- +1) \times 1$ vector of received samples at the output of the i'th matched filter, such that i=0 for 52a, i=1 for 52b, and i=K-1 for 52c. $v_{i,n}$ in eq. (12)

denotes the $(N^++N^-+1)\times 1$ vector of noise samples obtained at the output of the i'th matched filter. $a_{k,n}^{L_{ki}}$ in eq. (13) denotes the vector of k'th set of CPM pseudosymbols, to be observed by the i'th matched filter. $L_i$ in eq. (14) is the total length of CPM pseudosymbol vectors to be observed by the i'th matched filter. $a_{i,n}$ in eq. (15) denotes the $(L_i+K(N^++N^-))\times 1$ vector concatenation of all CPM pseudosymbols observed by the i'th matched filter. Finally, $g_{ki}$ in eq. (16) denotes the $L_{ki}\times 1$ vector concatenation of all CPM pulses convolved with the i'th matched filter. Note that each matched filter has the impulse response that is matched to a CPM pulse.

The CPM transmit pulses, and the matched filters at the demodulator pave way to an equivalent transmit and receive pulse convolution model. In line with the sliding window observation model, it is appropriate to define a pulse convolution matrix, denoted as $H_i$.

In light of eqs. (11) to (16), we may express the received vector that will be inputted to the i'th linear filter in a more compact form as $$r_{i,n}=H_i a_{i,n}+v_{i,n} \qquad (17)$$

In a preferred embodiment, the linear filters is appropriately designed with respect to the minimum mean square error (MMSE) criteria. MMSE filters offer a balance between cancellation of noise and suppression of interference, hence an adequate choise for the design of linear filters.

Let $R_i$ and $p_i$ represent the autocorrelation matrix and the cross-correlation vector for the i'th MMSE filter. Then the optimum tap weights for linear MMSE filters can be obtained by solving the Wiener-Hopf equations, which results in the optimum tap weight vector for the i'th MMSE filter as $$w_i=R_i^{-1}p_i \qquad (18)$$

The autocorrelation matrix for the input vector of the i'th MMSE filter is defined as $$R_i \triangleq \mathbb{E}[r_{i,n}r_{i,n}^{\mathcal{H}}] \qquad (19)$$

where $\mathcal{H}$ denotes the Hermitian transpose (complex conjugate transpose) operation, and $\mathbb{E}[.]$ denotes the statistical expectation operation.

Inserting eq. (17) in eq. (19), one obtains $$R_i=H_i A_i \mathbf{H}_i^{\mathcal{H}}+V_i \qquad (20)$$

where the $(L_i+K(N^++N^-))\times(L_i+K(N^++N^-))$ matrix $A_i$ is the autocorrelation matrix for the CPM pseudosymbol vectors. The $(N^++N^-+1)\times(N^++N^-+1)$ matrix $V_i$ on the other hand denotes the noise covariance matrix The cross-correlation vector between the i'th MMSE input vector $r_{i,n}$ and the desired CPM pseudosymbol $\alpha_{i,n}$ is defined as $$p_i \triangleq \mathbb{E}[r_{i,n}a_{i,n}^*] \qquad (21)$$
$$= H_i A_i e_i \qquad (22)$$

where, the $(L_i+K(N^++N^-))\times 1$ vectors, denoted by $e_i$, are defined to assist the calculations. For convenience, let $e_i$ for the i=0'th, i=1'st, and i=2'nd filters be defined as $$e_0 \triangleq [0_{1\times N^+},1,0_{1\times(L_{00}+N^--1)},0_{1\times(L_{10}+L_{20}+(K-1)(N^+N^-))}]^T \qquad (23)$$

$$e_1 \triangleq [0_{1\times(L_{01}+N^++N^-)},0_{1\times N^+},1,0_{1\times(L_{11}+N^--1)},0_{1\times(L_{21}+N^++N^-)}]^T \qquad (24)$$

$$e_2 \triangleq [0_{1\times(L_{02}+L_{12}+(K-1)(N^++N^-))},0_{1\times N^+},1,0_{1\times(L_{22}+N^--1)}]^T \qquad (25)$$

Combining eq. (18), eq. (20), eq. (21), the optimum tap weight vector for the i'th MMSE filter is obtained as $$w_i=[H_i A_i \mathbf{H}_i^{\mathcal{H}}+V_i]^{-1}p_i \qquad (26)$$

Following the linear MMSE filtering is the symbol detection 55. The detector requires the detection metrics to process the data. For this, a statistical description for the linear MMSE output samples is required.

The output samples of MMSE linear filters can be accurately approximated by a signal+Gaussian noise statistical model [15, 16]. Accordingly, the sample observed at the output of the i'th MMSE filter, $\hat{\alpha}_{i,n}=w_i^{\mathcal{H}}r_{i,n}$ can be modeled as $$\hat{\alpha}_{i,n}=\mu_i \alpha_{i,n}+\omega_{i,n}, \quad i=0,\ldots,K-1 \qquad (27)$$

where $\mu_i$ is the scaling constant or the filter gain for the i'th MMSE filter, and $\omega_{i,n}\sim\mathcal{N}(0,\sigma_{w,i}^2)$ denotes the noise sample at n. Note that the notation $\mathcal{N}(\ldots)$ denotes Gaussian distribution, for which the first argument is the mean, and the second argument is the variance.

At the feedforward MMSE filter outputs 54, noisy and sealed mean estimates for the CPM pseudosymbols are obtained, such that 54a, 54b, ..., 54c refer to $\hat{\alpha}_{0,n}$, $\hat{\alpha}_{1,n}$, and $\hat{\alpha}_{K-1,n}$, respectively. Hence the effect of CPM memory is indeed reduced to a scaling constant and additive noise, as given in the memoryless signal+noise model in eq. (27).

Following the linear filters 53a, 53b, ..., 53c in FIG. 5, CPM symbol detector 55 can be designed to operate over a joint trellis which can be defined as the modulo p summation of 205a, 205b, ..., 205c such that $$x_n \triangleq [x_n^{(0)}+x_n^{(1)}+\ldots+x_n^{(P-1)}]_p \qquad (28)$$

where $[.]_p$ operation denotes modulo p operation. The joint trellis for $x_n$ has only p states since $x_n$ can take on only p distinct values at each n. As such, the CPM symbol detector 55 requires only p states as opposed to $pM^{L-1}$ states required for an optimum CPM demodulator. This significant reduction in detection complexity is a result of combating the CPM memory with the use of linear interference suppression filters, 53a, 53b, ..., 53c that are implemented in parallel.

In a preferred embodiment, the p-state CPM symbol detector, 55 can be employed based on the maximum likelihood criteria. CPM symbol detector exploits the memoryless signal+noise model in eq. (27) to calculate the likelihood values for the CPM pseudosymbols, $f(\hat{\alpha}_{0,n}, \hat{\alpha}_{1,n}, \ldots, \hat{\alpha}_{K-1,n}|\alpha_{0,n}, \alpha_{1,n}, \ldots, \alpha_{K-1,n})$. $f(.)$ denotes the likelihood function. For such an embodiment, symbol detector 55 returns the data symbol estimates as $$\hat{\alpha}_n = \underset{\alpha}{\arg\max} f(\hat{\alpha}_{0,n}, \hat{\alpha}_{1,n}, \ldots, \hat{\alpha}_{K-1,n} | \alpha_n) \qquad (29)$$

In another preferred embodiment, the p-state CPM symbol detector 55 can be realized with respect to maximum a posteriori probability criteria. Symbol detector calculates the a posteriori probability for each modulation symbol, denoted by $\mathbb{P}(\alpha_n|\hat{\alpha}_{0,n}, \hat{\alpha}_{1,n}, \ldots, \hat{\alpha}_{K-1,n})$, and selects the symbol estimate for which the a posteriori probability is maximized. According to the MAP criteria, symbol detector 55 returns the data symbol estimates as $$\hat{\alpha}_n = \underset{\alpha}{\arg\max} \mathbb{P}(\alpha_n | \hat{\alpha}_{0,n}, \hat{\alpha}_{1,n}, \ldots, \hat{\alpha}_{K-1,n}) \qquad (30)$$

Such a MAP symbol detector also has only p states.

In another preferred embodiment of present demodulator, CPM can be jointly decoded within an iterative channel coding scheme where soft information on the CPM pseudosymbols become available. In such an embodiment, interference reduction performance of the linear MMSE filters can be further enhanced by feeding soft decisions on CPM pseudosymbol estimates back into the linear filters as shown in FIG. 6.

A more detailed description for the soft interference cancellation demodulation structure in FIG. 6 is what follows:

Detailed Description of the Demodulator in FIG. 6

In another preferred embodiment, a receiver comprises a demodulator 110, a channel decoder 112, and at least one interleaver and one deinterleaver 111. An interleaver, which is inherent in such an embodiment is not explicitly indicated the receiver section in FIG. 1. In such an embodiment, to demodulate the baseband received waveform 109, the demodulator 110 comprises a bank of K matched filters on parallel arms as the noise reduction filter 50 at the receiver front end, the outputs of which are sampled 51 at symbol time, leading to the production of a set of received samples 600 (i.e., 600a: $r_{0,n}$, 600b: $r_{1,n}$, ..., 600c: $r_{K-1,n}$) on parallel arms. The demodulator 110 in such an embodiment further comprises a set of K linear filters with soft decision feedback, a CPM SISO symbol detector 604, a remodulator 606, a SISO channel decoder 607, which feeds the a priori information back to the CPM SISO symbol detector 604, and produces a posteriori data estimates 610. The remodulator 606 feeds the intersymbol interference estimates 603 back to the linear filters with soft decision feedback 601. In such an embodiment, the channel decoder 112 is realized as a SISO channel decoder 607.

The linear soft decision feedback filters 601 produce CPM pseudosymbol estimates 602 (i.e., 602a: $\hat{\alpha}_{0,n}$, 602b: $\hat{\alpha}_{0,n}$, ..., 602c: $\hat{\alpha}_{K-1,n}$), which are typically more accurate estimates of original CPM pseudosymbols due to the intersymbol interference reduction facilitated by soft decision feedback. Once the linear filters produce modulation symbol estimates 602, mean interference estimates can be obtained by remodulating 606 the estimated modulation symbols. Let the mean interference estimate vectors be defined as $$\tilde{a}_{k,n}^{L_{ki}} \triangleq [\tilde{\alpha}_{k,n+N^+}, \ldots, \tilde{\alpha}_{k,n}, \ldots, \tilde{\alpha}_{k,n-N^--L_{ki}+1}]_{(L_{ki}+N^++N^-) \times 1}^T \quad (31)$$

where the sample, $\tilde{a}_{k,n}$ is zero if i=k for the i'th MMSE filter, and $\tilde{a}_{k,n} = \hat{\alpha}_{k,n}$ otherwise, such that $\tilde{a}_{k,n}$ is the mean estimate of $\alpha_{k,n}$.

Stacking all the $\tilde{a}_{k,n}^{L_{ki}}$ for k=0, ..., K−1 in a tall interference vector, one obtains $$\tilde{a}_{i,n} \triangleq [[\tilde{a}_{0,n}^{L_{0i}}]^T, [\tilde{a}_{1,n}^{L_{1i}}]^T, \ldots, [\tilde{a}_{K-1,n}^{L_{(K-1)i}}]^T]_{(L_i+K(N^++N^-)) \times 1}^T \quad (32)$$

At remodulation stage 606, the intersymbol interference estimates are also multiplied by the pulse convolution matrix ($H_i$) to obtain $H_0\tilde{a}_{0,n}$ for 603a, $H_1\tilde{a}_{1,n}$ for 603b, and $H_{K-1}\tilde{a}_{K-1,n}$ for 603c, respectively.

The remodulated interference estimates are now subtracted from the received vector prior to the MMSE filtering. Then the input to the i'th MMSE filter at presence of soft-decision feedback becomes $$r_{i,n}^f = r_{i,n} - H_i \tilde{a}_{i,n} \quad (33)$$

$$= H_i(a_{i,n} - \tilde{a}_{i,n}) + v_{i,n} \quad (34)$$

$$= H_i e_i a_{i,n} + v_{i,n} \quad (35)$$

Following from eq. (35), the autocorrelation matrix at presence of soft-decision feedback for the input vector becomes $$R_i^f = \mathbb{E}[r_{i,n}^f [r_{i,n}^f]^\mathcal{H}] \quad (36)$$

$$= \mathbb{E}[H_i e_i a_{i,n} a_{i,n}^* e_i^T [H_i]^\mathcal{H}] + V_i \quad (37)$$

$$= H_i e_i e_i^T [H_i]^\mathcal{H} + V_i \quad (38)$$

where eq. (38) follows from the fact that $\mathbb{E}[\alpha_{i,n}\alpha_{i,n}^*]=1$.

The cross correlation vector between the input vector with soft-decision feedback and the desired CPM pseudosymbol for the i'th MMSE filter becomes $$p_i^f = \mathbb{E}[r_{i,n}^f a_{i,n}^*] \quad (39)$$

$$= \mathbb{E}[(H_i e_i a_{i,n} + v_{i,n}) a_{i,n}^*] \quad (40)$$

$$= H_i e_i \quad (41)$$

Noise covariance matrix for soft-decision feedback case is exactly the same as the feedforward case of FIG. 5.

Following from eq. (38) and eq. (41), the optimum tap weight vector at presence of soft-information feedback becomes $$w_i^f = [R^f]^{-1} p_i^f \quad (42)$$

$$= [H_i e_i e_i^T [H_i]^\mathcal{H} + V_i]^{-1} p_i^f \quad (43)$$

$$= [p_i^f [p_i^f]^\mathcal{H} + V_i]^{-1} p_i^f \quad (44)$$

The signal+noise model for the soft-decision feedback case is now specified as $$\hat{\alpha}_{i,n} = \mu_i^f \alpha_{i,n} + \omega_{i,n}^f, \quad i=0, \ldots, K-1 \quad (45)$$

where $\hat{\alpha}_{i,n}$ 602 is the sample observed at the output of the i'th MMSE filter at time instant n, $\mu_i^f$ is the sealing constant or the filter gain for the i'th MMSE filter for the soft-decision feedback case, and the $\omega_{i,n}^f$ is the noise sample for the soft-decision feedback case.

The CPM SISO Symbol Detector 604 receives the CPM pseudosymbol estimates 602, and performs soft demodulation, and produces soft decisions (i.e., probabilities) 605 on the joint CPM state as given in eq. (28). The CPM SISO Symbol Detector also produces the extrinsic information on the CPM pseudosymbols, which is fed to the SISO channel decoder unit 607.

Interplay between SISO modules, 604 and 607 is similar to an iterative turbo decoder, where the CPM detector 604 serves as the inner SISO unit, and the channel decoder 607 serves the outer SISO unit. The inner SISO decoder 604 produces and delivers extrinsic information 608 to outer SISO decoder 607. Outer SISO decoder 607 on the other hand produces and feeds a priori information 609 back to inner SISO decoder 604. Such information exchange between inner and outer SISO decoders can be repeated a number of times, which are termed "iterations". At the end of the final iteration, a posteriori data estimates 610 are generated.

Alternative Preferred Configurations for Demodulator Section

In a preferred embodiment, the noise reduction filter 50 can be realized as a single low pass filter.

In a preferred embodiment, the number of taps for each MMSE filter 53a, 53b, . . . , 53c in FIG. 5, and 601a, 601b, . . . , 601c in FIG. 6 can be set to different values, such as $N_0, N_1, \ldots, N_{K-1}$, respectively.

In another preferred embodiment, the number of taps for each MMSE filter 53a, 53b, . . . , 53c in FIG. 5, and 601a, 601b, . . . , 601c in FIG. 6 can all be set to the same value, $N_0=N_1 \ldots N_{K-1}=N$.

Potential Implementations for Modulator and Demodulator Structures within Invention In a preferred embodiment, transmit 100-113 and receive 200-607 components can be partially or fully implemented on Field Programmable Logic Array (FPGA) platforms.

In another preferred embodiment, transmit 100-113 and receive 200-607 components can be partially or fully implemented on Application Specific Integrated Circuits (ASIC).

Yet in another preferred embodiment, transmit 100-113 and receive 200-607 components can be partially or fully implemented on Digital Signal Processing (DSP) platforms.

Yet in another preferred embodiment, transmit 100-113 and receive 200-607 components can be partially or fully implemented on software.

Yet in another preferred embodiment, various combinations of FPGAs, ASIC and DSP and software can be used to implement transmit 100-113 and receive 200-607 components can be partially or fully.

Exemplar Performance of Modulator Part

Figure 7:
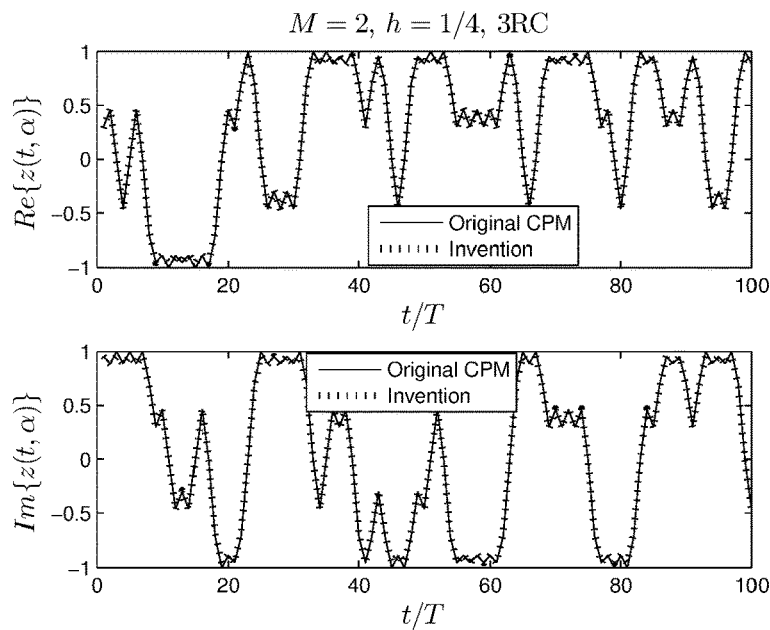
FIG. 7, FIG. 8, FIG. 9 and FIG. 10 depict example baseband transmit signals for M=2, h=¼, 3RC CPM, M=2, h=¼, 4RC CPM, M=4, h=¼, 3RC CPM, and M=4, h=¼, 4RC CPM, respectively, to illustrate performance of modulator section of invention. Signals obtained by invention are presented in comparison with original CPM signals.
Figure 8:
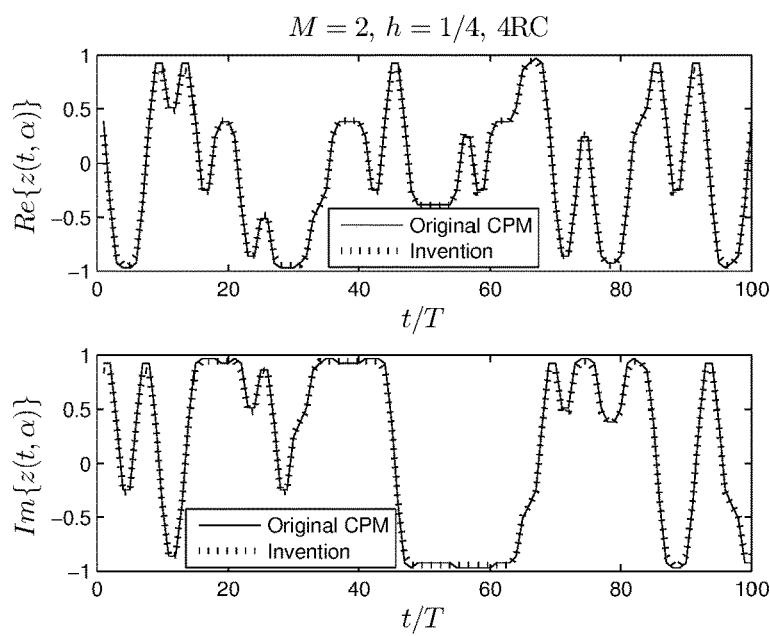

FIG. 7 and FIG. 8 exemplify baseband transmit signal generated by invention with comparison to original CPM signal in a binary setting, for two example configurations, M=2, h=¼, 3RC, and M=2, h=¼, 4RC, respectively. The upper panels and the lower panels in the graphs show the real component of the baseband transmit signal, $\text{Re}\{z(t,\alpha)\}$, and the imaginary component, $\text{Im}\{z(t,\alpha)\}$, respectively. The x-axis for both upper and lower panel graphs denotes the time, normalized with symbol duration, t/T. As seen in both FIG. 7 and FIG. 8, baseband transmit signal generated by invention follows original CPM signal very closely. In particular, the mean square distance between transmit signal obtained by invention and the original CPM signal is $9.2 \times 10^{-4}$ for FIG. 7, and $1.68 \times 10^{-2}$ for FIG. 8.

Figure 9:
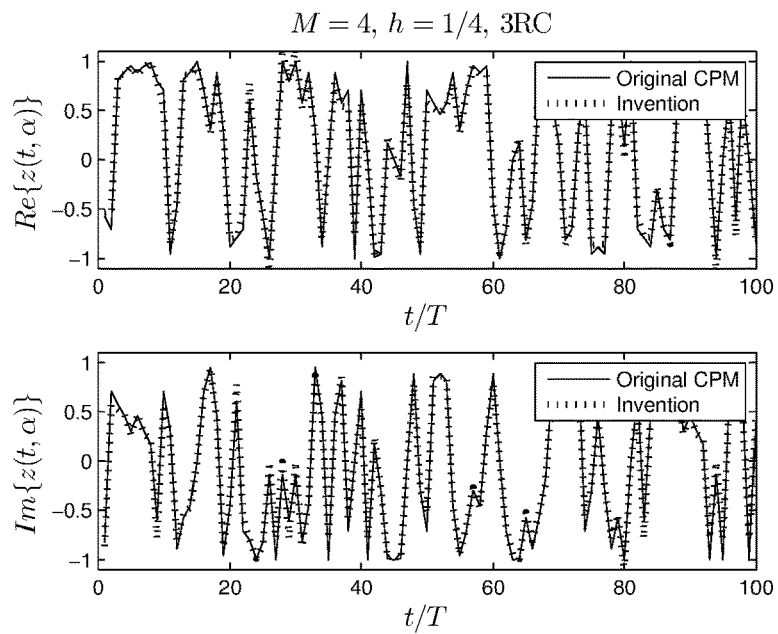
Figure 10:
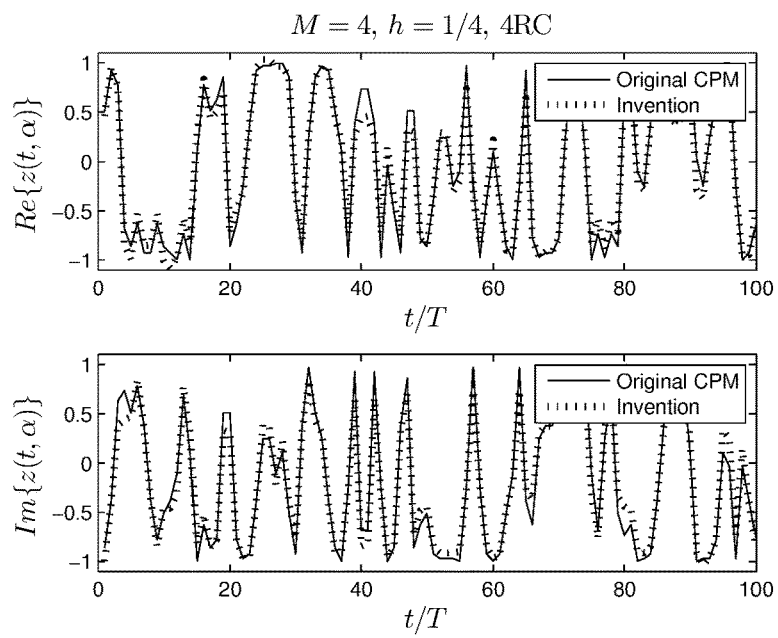

FIG. 9 and FIG. 10 illustrate similarly, baseband transmit signal generated by invention with comparison to original CPM signal in a quaternary setting, for two other example configurations, M=4, h=¼, 3RC, and M=4, h=¼, 4RC, respectively. As seen in both FIG. 9 and FIG. 10, baseband transmit signal generated by invention and original CPM signal still track one another very closely. In particular, the mean square distance between transmit signal obtained by invention and the original CPM signal is $2.42 \times 10^{-3}$ for FIG. 9, and $2.93 \times 10^{-2}$ for FIG. 10.

Exemplar Performance of Demodulator Part

Figure 11:
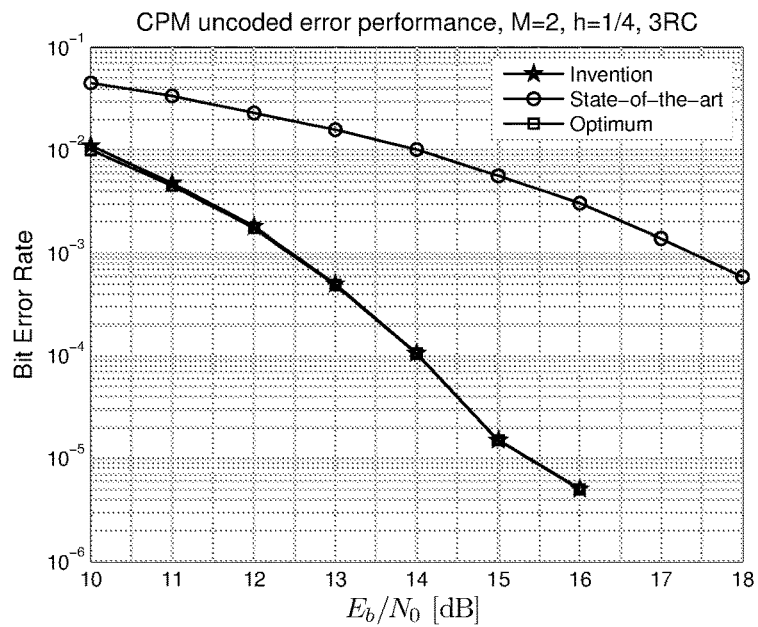
FIG. 11, FIG. 12, FIG. 13 and FIG. 14 depict the uncoded bit error rates (BER) to illustrate performance of demodulator section of invention.
Figure 12:
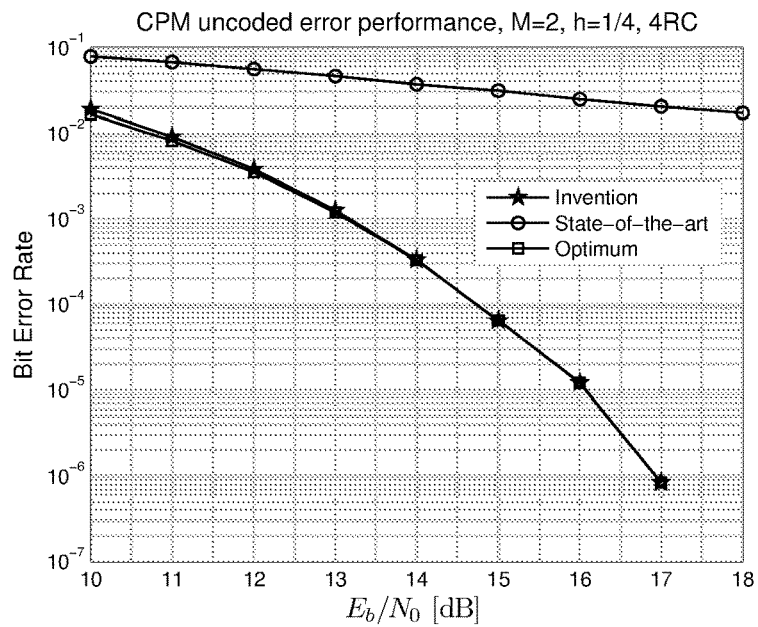

FIG. 11 and FIG. 12 illustrate bit error rate performance of the invention for binary CPM at absence of any channel coding (uncoded) for M=2, h=¼, and a 3RC, and a 4RC pulse, respectively. Since M=2 for this binary setup, demodulator within invention is realized a single matched filter ($K=2^P-1=1$) that is matched to the transmit Laurent pulse, a single MMSE filter with $N^+=N^-=2$, and a 4-state CPM symbol detector. Identical results are obtained when an ideal low pass filter is used in place of a matched filter. The x-axis in FIG. 11 and FIG. 12 denotes the ratio of the energy of one bit $E_b$, to the noise density, $N_0$. As seen in FIG. 11 and in FIG. 12, the invention follows the optimal performance very closely, while the state-of-the-art reduced complexity method of [9-13] remains significantly inferior as the pulse length is longer than 2 symbol durations (L>2).

Figure 13:
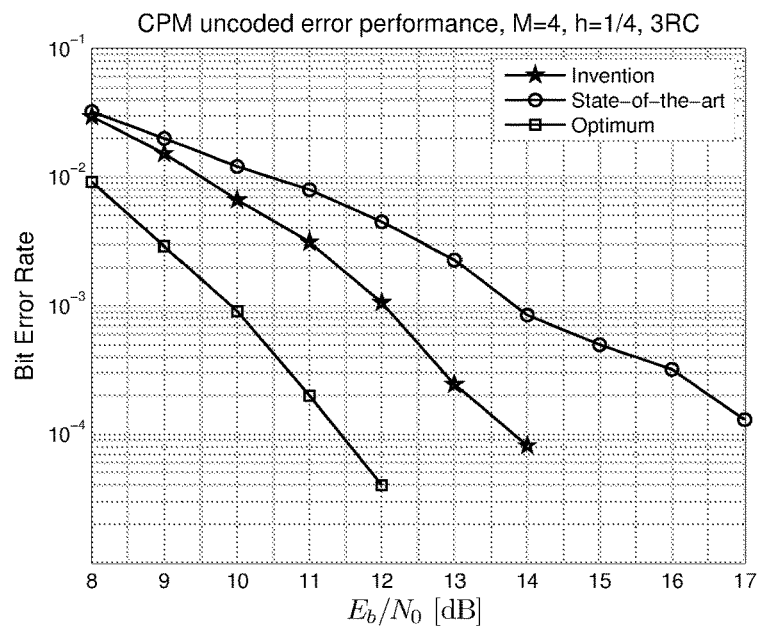
Figure 14:
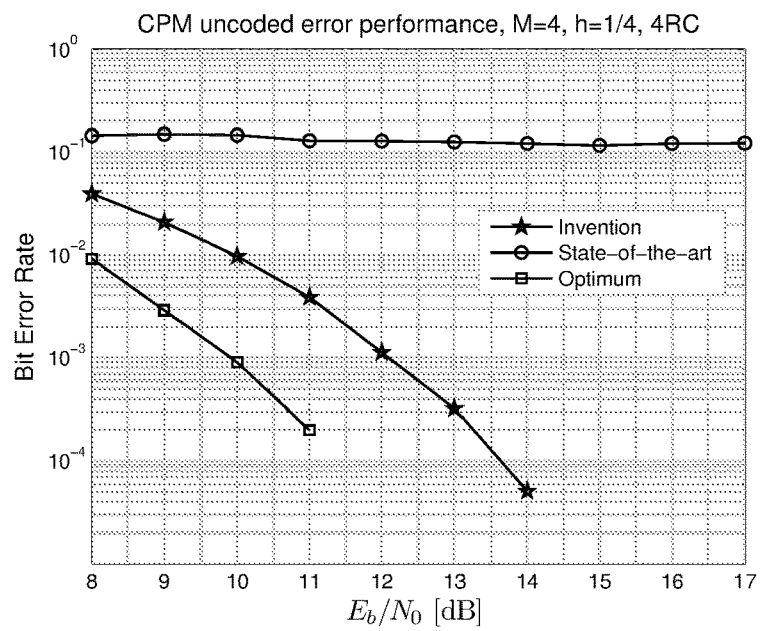

FIG. 13 and FIG. 14 similarly illustrate bit error rate performance of the invention for quaternary CPM at absence of any channel coding (uncoded) for M=4, h=¼, 3RC, and 4RC, respectively. Since M=4 for quaternary CPM, demodulator within invention is realized with $K=2^P-1=3$ parallel matched filters that are matched to the transmit Laurent pulses, with K=3 parallel MMSE filters with $N^+=N^-=2$, and a 4-state CPM symbol detector. Identical results are obtained when an ideal low pass filter is used in place of the matched filter bank. The MMSE filters are realized with the same number of taps, i.e., $N_0=N_1=N_2=N^++N^-+1=5$. Setting $N_0, N_1, N_2$ to different or higher values has been observed not to make any remarkable difference. As seen in FIG. 13 and FIG. 14, the invention performs considerably better than the state-of-the-art reduced complexity method of [9-13], which remains significantly inferior as the pulse length is longer than 2 symbol durations (L>2).

Although described in the context of particular embodiments, it will be apparent to those skilled in the art that a number of modifications and various changes to these changes may occur. Thus, while the invention has been particularly shown and described with respect to one or more preferred embodiments thereof, it will be understood by those skilled in the art that certain modifications or changes may be made therein without departing from the scope and spirit of the invention as set forth above, or from the scope of the ensuing claims.

The Following REFERENCES are each incorporated in their entirety and as specified in the above text:

[1] T. Aulin, N. Rydbeck, and C.-E. Sundberg, "Continuous phase modulation—Part II: Partial response signaling," *Communications, IEEE Transactions on*, vol. 29, no. 3, pp. 210-225, March 1981.

[2] A. Svensson, C.-E. Sundberg, and T. Aulin, "A class of reduced-complexity viterbi detectors for partial response continuous phase modulation," *Communications, IEEE Transactions on*, vol. 32, no. 10, pp. 1079-1087, October 1984.

[3] L. Bahl, J. Cocke, F. Jelinek, and J. Raviv, "Optimal decoding of linear codes for minimizing symbol error rate," *Information Theory, IEEE Transactions on*, vol. 20, no. 2, pp. 284-287, 1974.

[4] J. Forney, G. D., "The viterbi algorithm," *Proceedings of the IEEE*, vol. 61, no. 3, pp. 268-278, March 1973.

[5] P. Laurent, "Exact and approximate reconstruction of digital phase modulations by superposition of amplitude modulated pulses (amp)," *IEEE Trans. Commun.*, vol. 34, no. 2, pp. 150-160, 1986.

[6] U. Mengali and M. Morelli, "Decomposition of M-ary cpm signals into pam waveforms," *IEEE Trans. Inf. Theory*, vol. 41, no. 5, pp. 1265-1275, September 1995.

[7] G. Kaleh, "Simple coherent receivers for partial response continuous phase modulation," *IEEE J. Set Areas Commun.*, vol. 7, no. 9, pp. 1427-1436, December 1989.

[8] M. R. Shane and R. D. Wesel, "Reduced Complexity Iterative Demodulation and Decoding of Serial Concatenated Continuous Phase Modulation," in *in Proc. IEEE Int. Conf. on Commun* 2002, pp. 1672-1676.

[9] G. Colavolpe and R. Raheli, "Reduced-complexity detection and phase synchronization of cpm signals," *Communications, IEEE Transactions on*, vol. 45, no. 9, pp. 1070-1079, September 1997.

[10] G. Colavolpe and A. Barbieri, "Simplified Iterative Detection of Serially Concatenated CPM Signals," in *Global Telecommunication Conference, 2005. GLOBECOM '05. IEEE*, vol. 3, November—2 Dec. 2005, p. 5 pp.

[11] A. Barbieri and G. Colavolpe, "Simplified soft-output detection of cpm signals over coherent and phase noise channels," *IEEE Trans. Wireless Commun.*, vol. 6, no. 7, pp. 2486-2496, July 2007.

[12] A. Cero, D. Fertonani, G. Colavolpe, and M. Wylie-Green, "On reduced-complexity soft-output detection of continuous phase modulations," in *Vehicular Technology Conference, 2008. VTC Spring 2008. IEEE*, May 2008, pp. 1092-1096.

[13] E. Casini, D. Fertonani, and G. Colavolpe, "Advanced CPM Receiver for the NATO Tactical Narrowband Waveform," in *MILITARY COMMUNICATIONS CONFERENCE, 2010—MILCOM 2010*, 31 2010—Nov. 3, 2010, pp. 1725-1730.

[14] X. Huang and Y. Li, "Simple noncoherent cpm receivers by pam decomposition and mmse equalization," in *Personal, Indoor and Mobile Radio Communications, 2003. PIMRC 2003. 14th IEEE Proceedings on*, vol. 1, September 2003, pp. 707-711 Vol 1.

[15] H. Poor and S. Verdu, "Probability of error in mmse multiuser detection," *Information Theory, IEEE Transactions on*, vol 43, no. 3, pp. 858-871, May 1997.

[16] X. Wang and H. Poor, "Iterative (turbo) soft interference cancellation and decoding for coded cdma," *Communications, IEEE Transactions on*, vol. 47, no. 7, pp. 1046-1061, July 1999.

The invention claimed is:

1. A demodulator for performing low complexity coherent demodulation of constant or quasi-constant envelope Continuous Phase Modulation (CPM) signals for a baseband received signal to generate desired modulation symbol estimates, wherein the demodulator comprises:

a noise reduction filter for filtering the baseband received signal to generate received samples which are sampled at symbol time;

a bank of K linear Minimum Mean Square Error (MMSE) filters for producing CPM pseudosymbol estimates; and a symbol detector for performing symbol detection on the CPM pseudosymbol estimates to generate the desired modulation symbol estimates, wherein the demodulator is compatible with alphabet lengths (M>=2), all modulation indexes (h), all pulse lengths (L), and all pulse types, K=1 when M=2, and K>1 when M>2, and the K linear MMSE filters are in parallel and combat interference for M>2 or L>1.

2. The demodulator according to claim 1, wherein the symbol detector comprises a CPM symbol detector and the linear MMSE filters operate according to the MMSE criteria in which an optimum tap weight coefficient vector is represented by $w_i = [H_i A_i H_i^H + V_i]^{-1} p_i$ where $H_i$ is a pulse convolution matrix, H denotes a complex conjugate operator, $A_i$ is an autocorrelation matrix for the CPM pseudosymbol vectors, $V_i$ is a noise covariance matrix, and $p_i$ is a cross-correlation vector between an input and a desired response of the linear MMSE filters.

3. The demodulator according to claim 2, wherein samples observed at the output of the linear MMSE filters are approximated according to a memoryless model of $\hat{a}_{i,n} = \mu_i a_{i,n} + \omega_{i,n}$ where $\mu_i$ is a scaling constant or a filter gain for the MMSE filters, $\omega_{i,n}$ denotes a Gaussian distributed noise sample with zero mean and variance $\sigma_{\omega_i}^2$, and the use of linear MMSE filters result in a memoryless, signal plus noise model, in which the effect of ISI is reduced.

4. The demodulator according to claim 1, wherein the CPM symbol detector is a p-state CPM symbol detector that results in a reduction of demodulation complexity from $pM^{L-1}$ states to only p states for all selections of h, M and L, where p is the denominator of the modulation index.

5. The demodulator according to claim 4, wherein the e-state CPM symbol detector performs symbol detection based on a maximum likelihood (ML) criteria where the desired symbol estimates are obtained as $$\hat{\alpha}_n = \underset{\alpha}{\operatorname{argmax}} f(\hat{a}_{0,n}, \hat{a}_{1,n}, \ldots, \hat{a}_{K-1,n} \mid \alpha_n),$$

or based on a maximum a posteriori probability (MAP) criteria where the desired modulation symbol estimates are obtained as $$\hat{\alpha}_n = \underset{\alpha}{\operatorname{argmax}} P(\alpha_n \mid \hat{a}_{0,n}, \hat{a}_{1,n}, \ldots, \hat{a}_{K-1,n})$$

where $\alpha_n$ denotes an M-ary message symbol of a CPM alphabet of size M.

6. The demodulator according to claim 1, wherein the symbol detection is performed using soft interference cancellation and the bank of linear MMSE filters receive a soft decision feedback and subtract remodulated interference estimates from the received samples before performing filtering to produce the CPM pseudosymbol estimates, and the demodulator further comprises:

a CPM Soft Input Soft Output (SISO) symbol detector for performing symbol detection on the CPM pseudosymbol estimates using a priori information to produce soft decisions on a joint CPM state and to generate extrinsic information;

a remodulator which generates and feeds intersymbol interference estimates back to the linear filters with soft decision feedback as the remodulated interference estimates; and a SISO channel decoder which generates and feeds the a priori information back to the CPM SISO symbol detector, and produces a posteriori data estimates that are used as the desired modulation symbol estimates.

7. The demodulator according to claim 6, wherein the CPM SISO symbol detector and the SISO channel decoder operate such that demodulation and channel decoding are performed jointly in an iterative fashion by repeatedly producing and delivering the extrinsic information to the SISO channel decoder and producing and feeding the a priori information to the CPM SISO detector a number of times and at the end of a final iteration, the a posteriori data estimates are generated.

8. The demodulator according to claim 6, wherein the linear MMSE filters with soft decision feedback are realized using a minimum mean square error with soft interference cancellation (MMSE-SIC) criteria, according to which an optimum tap weight coefficient vector is represented by $w_i^f = [p_i^f [p_i^f]^H + V_i]^{-1} p_i^f$ where $p_i^f$ is a cross-correlation vector between an input and a desired response of the linear MMSE filters with soft decision feedback, $V_i$ is a noise covariance matrix, and H denotes a complex conjugate operator.

9. The demodulator according to claim 8, wherein samples observed at an output of the linear MMSE filters with soft decision feedback are approximated according to a memoryless model of $\hat{a}_{i,n} = \mu_i^f a_{i,n} + \omega_{i,n}^f$ where $\hat{a}_{i,n}$ is a sample observed at the output of the linear MMSE filters with soft decision feedback, $\mu_i^f$ is a scaling constant or a filter gain for the linear MMSE filters with soft decision feedback, $\omega_{i,n}^f$ is a noise sample with zero mean and variance $$\sigma^2_{\omega_{i,n}^f},$$

and the linear MMSE filters with soft decision feedback results in a memoryless, signal plus noise model in which the effect of ISI is further reduced due to soft interference cancellation.

10. The demodulator according to claim 1, wherein the noise reduction filter is a bank of matched filters each having an impulse response that is matched to a CPM pulse which is obtained from a Laurent, Mengali-Morelli decomposition of the CPM pseudosymbols.

11. The demodulator according to claim 1, wherein the demodulator is implemented using various combinations of Field Programmable Logic arrays, Application Specific Integrated Circuits, Digital Signal Processing platforms and software.

12. A method for low complexity coherent demodulation of constant or quasi-constant envelope Continuous Phase Modulation (CPM) signals for a baseband received signal to generate desired modulation symbol estimates, wherein the method comprises:
    filtering the baseband received signal using a bank of K noise reduction filters to generate received samples which are sampled at symbol time;
    performing linear filtering on the received samples using a bank of K linear Minimum Mean Square Error (MMSE) filters to produce CPM pseudosymbol estimates;
    performing symbol detection on the CPM pseudosymbol estimates to generate the desired modulation symbol estimates,
    wherein the method is compatible with alphabet lengths (M>=2), all modulation indexes (h), all pulse lengths (L), and all pulse types, K=1 when M=2, and K>1 when M>2, and the K linear MMSE filters are in parallel and combat interference for M>2 or L>1.

13. The method according to claim 12, wherein the symbol detection is performed using a CPM symbol detector and the linear MMSE filters are realized using the MMSE criteria, according to which an optimum tap weight coefficient vector is represented by $w_i = [H_i A_i H_i^H + V_i]^{-1} p_i$ where $H_i$ is a pulse convolution matrix, H denotes a complex conjugate operator, $A_i$ is an autocorrelation matrix for the CPM pseudosymbol vectors, $V_i$ is a noise covariance matrix, and $p_i$ is a cross-correlation vector between an input and a desired response of the linear MMSE filters.

14. The method according to claim 13, wherein samples observed at the output of the linear MMSE filters are approximated according to a memoryless model of $\hat{a}_{i,n} = \mu_i a_{i,n} + \omega_{i,n}$ where $\mu_i$ is a scaling constant or a filter gain for the MMSE filters, $\omega_{i,n}$ denotes a Gaussian distributed noise sample with zero mean and variance $\sigma_{\omega_i}^2$, and the use of linear MMSE filters result in a memoryless, signal plus noise model, in which the effect of ISI is reduced.

15. The method according to claim 12, wherein the performing of symbol detection further comprises using a Maximum A posteriori Probability (MAP) detection criteria where the desired modulation symbol estimates are obtained as $$\hat{\alpha}_n = \arg\max_\alpha f(\hat{a}_{0,n}, \hat{a}_{1,n}, \ldots, \hat{a}_{K-1,n} \mid \alpha_n),$$

or based on a maximum a posteriori probability (MAP) criteria where the desired modulation symbol estimates are obtained as $$\hat{\alpha}_n = \arg\max_\alpha P(\alpha_n \mid \hat{a}_{0,n}, \hat{a}_{1,n}, \ldots, \hat{a}_{K-1,n})$$

where $a_n$ denotes an M-ary message symbol of a CPM alphabet of size M.

16. The method according to claim 12, wherein the symbol detection is performed using soft interference cancellation comprising:
    performing linear filtering by subtracting remodulated interference estimates from the received samples before performing filtering using K linear MMSE filters with soft decision feedback to produce the CPM pseudosymbol estimates;
    performing the symbol detection on the CPM pseudosymbol estimates using a CPM Soft Input Soft Output (SISO) detector and a priori information to produce soft decisions on a joint CPM state and to produce extrinsic information;
    remodulating the CPM pseudosymbol estimates using a remodulator to obtain mean interference estimates that are used as the remodulated interference estimates; and
    using an SISO channel decoder to generate the a priori information and to generate a posteriori data estimates that are used as the desired modulation symbol estimates,
    wherein the linear MMSE filters with soft decision feedback provides for further reduction of ISI that is inherent in the CPM signals.

17. The method according to claim 16, wherein the CPM SISO symbol detector is used when a channel code is used, such that demodulation and channel decoding are performed jointly in an iterative fashion by repeatedly producing and delivering the extrinsic information to the SISO channel decoder and producing and feeding the a priori information to the CPM SISO detector a number of times and at the end of a final iteration, the a posteriori data estimates are generated.

18. The method according to claim 16, wherein the method comprises realizing the linear MMSE filters with soft decision feedback using a Minimum Mean Square Error with Soft Interference Cancellation (MMSE-SIC) criteria, according to which an optimum tap weight coefficient vector is represented by $w_i^f = [p_i^f[p_i^f]^H + V_i]^{-1} p_i^f$ where $p_i^f$ is a cross-correlation vector between an input and a desired response of the linear MMSE filters with soft decision feedback, $V_i$ is a noise covariance matrix, and H denotes a complex conjugate operator.

19. The method according to claim 18, wherein samples observed at an output of the linear MMSE filters with soft decision feedback are approximated according to a memoryless model of $\hat{a}_{i,n} = \mu_i^f a_{i,n} + \omega_{i,n}^f$ where $\hat{a}_{i,n}$ is a sample observed at the output of the linear MMSE filters with soft decision feedback, $\mu_i^f$ is a scaling constant or a filter gain for the linear MMSE filters with soft decision feedback, $\omega_{i,n}^f$ is a noise sample with zero mean and variance $$\sigma^2_{\omega_{i,n}^f},$$

and the linear niters with soft decision feedback results in a memoryless, signal plus noise model in which the effect of ISI is further reduced due to soft interference cancellation.

20. The demodulator according to claim 12, wherein the noise reduction filter is a bank of matched filters each having an impulse response that is matched to a CPM pulse which is obtained from a Laurent, Mengali-Morelli decomposition of the CPM.

* * * * *

UNITED STATES PATENT AND TRADEMARK OFFICE
CERTIFICATE OF CORRECTION

PATENT NO. : 10,374,853 B2
APPLICATION NO. : 15/907494
DATED : August 6, 2019
INVENTOR(S) : Ulaş Güntürkün Page 1 of 1

It is certified that error appears in the above-identified patent and that said Letters Patent is hereby corrected as shown below:

In the Specification

Column 1, Line 12, "signal, an" should read -- signal, and --.

Column 12, Line 17, "N ( . . . )" should read -- N ( . , . ) --.

In the Claims

Claim 5, Column 18, Line 23, "e-state" should read -- p-state --.

Claim 19, Column 21, Line 21, "linear niters with" should read -- linear MMSE filters with --.

Signed and Sealed this
Twenty-fifth Day of February, 2020

Andrei Iancu
*Director of the United States Patent and Trademark Office*